(12) United States Patent
Vora et al.

(10) Patent No.: US 12,724,909 B2
(45) Date of Patent: Sep. 1, 2026

(54) SYSTEM AND METHOD FOR DOWNSTREAM PLATFORM ACCESS ENABLEMENT TRIGGERED VIA AN ACTIVE METADATA CATALOG

(71) Applicant: JPMorgan Chase Bank, N.A., New York, NY (US)

(72) Inventors: Chirag Vora, Garnet Valley, PA (US); Vinaya Kumar Mandadapu, Newark, DE (US); Valli Musti, Scarsdale, NY (US); Matthew P. Agostinelli, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 100 days.

(21) Appl. No.: 18/760,974

(22) Filed: Jul. 1, 2024

(65) Prior Publication Data

US 2026/0003988 A1 Jan. 1, 2026

(51) Int. Cl.
*G06F 21/62* (2013.01)

(52) U.S. Cl.
CPC .. *G06F 21/6218* (2013.01); *G06F 2221/2141* (2013.01)

(58) Field of Classification Search
CPC .................... G06F 21/6218; G06F 2221/2141
USPC ............................................................ 726/1
See application file for complete search history.

(56) References Cited

U.S. PATENT DOCUMENTS 8,881,129 B1 * 11/2014 McKinnon .......... G06F 11/3688 717/168
10,552,176 B1 * 2/2020 Putney ...................... G06F 8/71
2003/0084282 A1 * 5/2003 Taruguchi ............... G06F 21/33 713/155
2006/0117056 A1 * 6/2006 Havewala ............... G06F 16/10 707/999.102
2009/0216717 A1 * 8/2009 Suereth .................. G06F 16/00
(Continued)

OTHER PUBLICATIONS

Koenen, Rob H., Jack Lacy, Michael Mackay, and Steve Mitchell. "The long march to interoperable digital rights management." Proceedings of the IEEE 92, No. 6 (2004): 883-897. (Year: 2004).*
(Continued)

*Primary Examiner* — Luu T Pham
*Assistant Examiner* — Walter J Malinowski
(74) *Attorney, Agent, or Firm* — GREENBLUM & BERNSTEIN, P.L.C.

(57) ABSTRACT

Various methods and processes, apparatuses or systems, and media for enabling consistent access enforcement across downstream data platforms triggered via an active data catalog are disclosed. A processor implements an active data catalog; causes the active data catalog to receive metadata updates corresponding to a line of business including properties that may be used to control access enforcement across the downstream data platforms; executes a certification process to certify the metadata updates including the properties that may be used to control access enforcement; stores the certified metadata updates onto the active data catalog; updates the active data catalog with the certified metadata updates along with certification details data; and distributes the certified metadata to the downstream data platforms thereby enabling consistent access control enforcement.

18 Claims, 10 Drawing Sheets

(56) References Cited

U.S. PATENT DOCUMENTS

| | | | | |
|---|---|---|---|---|
| 2015/0074565 | A1* | 3/2015 | Roche | G06F 16/951<br>715/763 |
| 2016/0094585 | A1* | 3/2016 | Shahbazian | H04L 63/205<br>726/1 |
| 2018/0081763 | A1* | 3/2018 | Christie | G06F 16/215 |
| 2021/0097188 | A1* | 4/2021 | Findlay | G06F 16/288 |
| 2022/0050671 | A1* | 2/2022 | Samuel | G06F 8/65 |
| 2022/0137844 | A1* | 5/2022 | Goss | G06F 3/0608<br>711/154 |
| 2023/0044156 | A1* | 2/2023 | Mehta | G06Q 10/0635 |
| 2023/0252733 | A1* | 8/2023 | Herrity | H04L 9/50<br>345/633 |
| 2025/0238545 | A1* | 7/2025 | Li | G06F 21/6245 |

OTHER PUBLICATIONS

Chase, Jeffrey S., and Ilya Baldin. “Federated authorization for managed data sharing: Experiences from the ImPACT project.” In 2021 International Conference on Computer Communications and Networks (ICCCN), pp. 1-10. IEEE, 2021. (Year: 2021).*

* cited by examiner

200

300

Figures 6A, 6B:
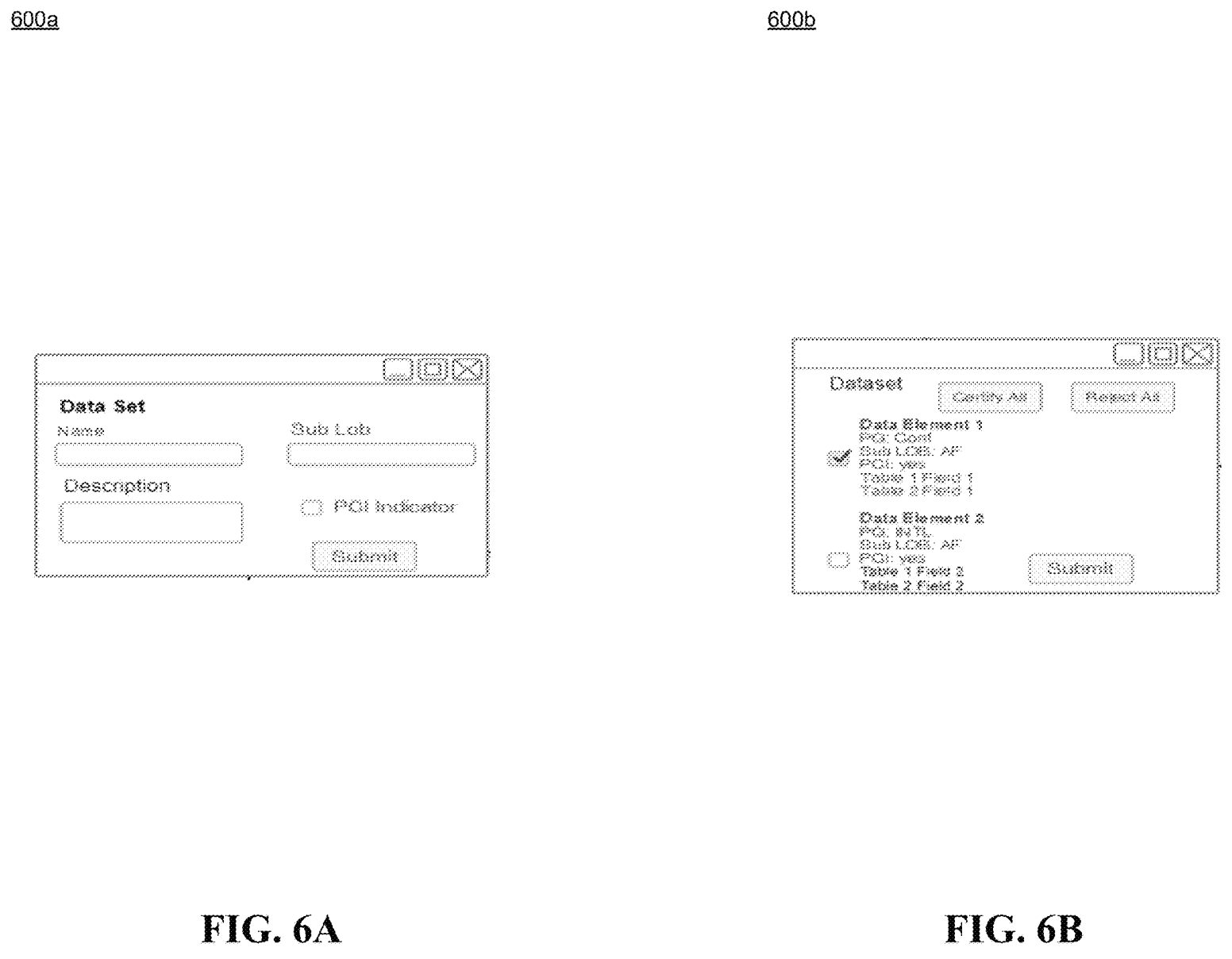

600a

Data Set

Name

Sub Lob

Description

PCI Indicator

Submit

Dataset

Certify All

Reject All

Data Element 1
PCI: Conf
Sub LOB: AF
PCI: yes
Table 1 Field 1
Table 2 Field 1

Data Element 2
PCI: INTL
Sub LOB: AF
PCI: yes
Table 1 Field 2
Table 2 Field 2

Submit

| WF ID | DSET/D ISR ID | FLD ID | Verifica tion Status | Status Date Time | Verfied By |
|---|---|---|---|---|---|
| 1 | HHJJS DHJKK | FLD 1 | A | 4/52023 3:00:00 T+ 5.30 | Q986753 |
| 1 | HHJJS DHJKK | FLD 2 | R | 4/52023 3:00:00 T+ 5.30 | Q986753 |

| DATA ELE UUID | DSET UUID | Protection Group Cert Status | Protection Group Cert Status Date Time | Protection Group Cert By | Protection Group | Data Element Name |
|---|---|---|---|---|---|---|
| HHJJS DHJKK | SDFFS F | C | 4/52023 3:00:00 T+ 5.30 | | CNF | |
| HHJJS DHJKK | JHSDK JHF | C | 8/32023 3:00:00 T+ 5.30 | | INTL | |
| ABHJL MGH | MXCVC XV | C | 4/52023 3:00:00 T+ 5.30 | | CNF | |

| DSET ID | DATA ELE ID | NEW_PRTC_GP_CD | PREV_PRTC_GP_CD | NEW_PRTC_GP_CERT_STS_CD | PREV_PRTC_GP_CERT_STS_CD | Audit Date Time |
|---|---|---|---|---|---|---|
| HHJJS DHJKK | SDFFSF | CNF | | C | | |
| HHJJS DHJKK | JHSDKJH F | INTL | CNF | C | C | |
| ABHJL MGH | MXCVCX V | CNF | | C | | |

SYSTEM AND METHOD FOR DOWNSTREAM PLATFORM ACCESS ENABLEMENT TRIGGERED VIA AN ACTIVE METADATA CATALOG

TECHNICAL FIELD

This disclosure generally relates to data processing, and, more particularly, to methods and apparatuses for implementing a platform, language, cloud, and database agnostic metadata change management module configured for enablement of consistent access enforcement across the data platforms triggered by an authoritative and active data catalog.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, every modern organization appears to be drowning in data. It may prove to be a valuable asset that needs to be visible, understood, and trusted in order to drive an organization's profitability, innovation, and growth. Data catalogs may provide a solution to this ever-growing data challenge. Moreover, active metadata appears to be becoming increasingly important in the modern data landscape, and expected to play a critical role in enabling organizations to extract maximum value from their data assets.

Conventional approaches/tools typically enable two-way movement of metadata by analyzing all types of metadata from various data sources and then sending enriched metadata back into different tools in a tech stack. However, these conventional approaches/tools lack configuration for active metadata catalog enablement thereby failing to enable consistent access enforcement across data platforms.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic metadata change management module configured to enable consistent access enforcement across a plurality of data platforms triggered by an authoritative and active data catalog, but the disclosure is not limited thereto. The active data catalog may be configured to serve as an authoritative system to collect, certify, store, and distribute metadata required for access controls to the downstream data platforms, wherein the authoritative system may be a catalog database.

In some embodiments, a method for enabling consistent access control enforcement across downstream data platforms by utilizing one or more processors along with allocated memory is disclosed. The method may include: implementing an active data catalog; receiving, by the active data catalog, metadata updates corresponding to a line of business including properties that may be used to control access enforcement across the downstream data platforms; executing a certification process to certify the metadata updates including the properties that may be used to control access enforcement; storing the certified metadata updates onto the active data catalog; updating the active data catalog with the certified metadata updates along with certification details data; publishing an event of the certified metadata updates for the downstream data platforms; distributing the certified metadata to the downstream data platforms; and applying changes, by consuming the event, corresponding to the certified metadata on the downstream data platforms enabling the consistent access control enforcement across the downstream data platforms.

In some embodiments, in executing the certification process, the method may further include: implementing an artificial intelligence/machine learning (AI/ML) model; and invoking the AI/ML model by calling a corresponding application programming interface to execute an auto approval check service to determine whether changes according to the metadata updates may be approved systematically without a data authority's intervention.

In some embodiments, when it is determined that the changes may be approved without the data authority's intervention, the method may include: transmitting an electronic notification to a computing device utilized by the data authority indicating that the changes may be approved without the data authority's intervention; executing, by the AI/ML model, the auto approval check service to automatically certifying the metadata updates and closing the certification process; persisting all changes corresponding to the certified metadata updates in the active data catalog; and publishing by the downstream data platforms, in response to persisting all changes corresponding to the certified metadata, an acknowledgement event.

In some embodiments, when it is determined that the changes may not be approved without the data authority's intervention, the method may include: transmitting an electronic notification to a computing device utilized by the data authority indicating that the changes may not be approved without the data authority's intervention; receiving input of a decision from the data authority indicating approval or rejection of the metadata changes in full or partial as appropriate by utilizing a catalog user interface; transmitting the decision back to the certification process via the catalog user interface; and publishing the event to a registration service about the decision and closing the certification process.

In some embodiments, in distributing the certified metadata to the downstream data platforms, the method may include: applying, by the downstream data platforms, the certified metadata updates based on corresponding platform's native technologies by consuming the event; consuming, by an audit application, the event to start an event reconciliation workflow executed by a reconciliation service; consuming, by a data exchange application, the event to enable one-click access functionality, wherein one-click access allows an end user to determine whether the end user has access on a particular dataset and request access in a single click when it is determined that the end user does not have access to the particular dataset; publishing by the downstream data platforms, in response to persisting all changes corresponding to the certified metadata, an acknowledgement event; consuming the acknowledgement event by an audit application and closing the event reconciliation workflow.

In some embodiments, the method may further include: utilizing, by the downstream data platforms, the certified updated metadata distributed by the active data catalog and policies from a policy store to provide access on datasets for downstream data platforms users.

In some embodiments, the method may further include: reconciling, by the reconciliation service, metadata information in a predefined periodic manner between the active data catalog and the downstream data platforms to ensure that the metadata in the active data catalog are the same as the metadata in the downstream data platforms.

In some embodiments, a system for enabling consistent access control enforcement across downstream data platforms is disclosed. The system may include: a processor; and a memory operatively connected to the processor via a communication interface, the memory storing computer readable instructions, when executed, may cause the processor to: implement an active data catalog; receive, by the active data catalog, metadata updates corresponding to a line of business including properties that may be used to control access enforcement across the downstream data platforms; execute a certification process to certify the metadata updates including the properties that may be used to control access enforcement; store the certified metadata updates onto the active data catalog; update the active data catalog with the certified metadata updates along with certification details data; publish an event of the certified metadata updates for the downstream data platforms; distribute the certified metadata to the downstream data platforms; and apply changes, by consuming the event, corresponding to the certified metadata on the downstream data platforms enabling the consistent access control enforcement across the downstream data platforms.

In some embodiments, in executing the certification process, the processor may be further configured to: implement an AI/ML model; and invoke the AI/ML model by calling a corresponding application programming interface to execute an auto approval check service to determine whether changes according to the metadata updates may be approved systematically without a data authority's intervention.

In some embodiments, when it is determined that the changes may be approved without the data authority's intervention, the processor may be further configured to: transmit an electronic notification to a computing device utilized by the data authority indicating that the changes may be approved without the data authority's intervention; execute, by the AI/ML model, the auto approval check service to automatically certifying the metadata updates and close the certification process; persist all changes corresponding to the certified metadata updates in the active data catalog; and publish by the downstream data platforms, in response to persisting all changes corresponding to the certified metadata, an acknowledgement event.

In some embodiments, when it is determined that the changes may not be approved without the data authority's intervention, the processor may be further configured to: transmit an electronic notification to a computing device utilized by the data authority indicating that the changes may not be approved without the data authority's intervention; receive input of a decision from the data authority indicating approval or rejection of the metadata changes in full or partial as appropriate by utilizing a catalog user interface; transmit the decision back to the certification process via the catalog user interface; and publish the event to a registration service about the decision and close the certification process.

In some embodiments, in distributing the certified metadata to the downstream data platforms, the processor may be further configured to: apply, by the downstream data platforms, the certified metadata updates based on corresponding platform's native technologies by consuming the event; consume, by an audit application, the event to start an event reconciliation workflow executed by a reconciliation service; consume, by a data exchange application, the event to enable one-click access functionality, wherein one-click access allows an end user to determine whether the end user has access on a particular dataset and request access in a single click when it is determined that the end user does not have access to the particular dataset; publish by the downstream data platforms, in response to persisting all changes corresponding to the certified metadata, an acknowledgement event; consume the acknowledgement event by an audit application and close the event reconciliation workflow.

In some embodiments, the processor may be further configured to: utilize, by the downstream data platforms, the certified updated metadata distributed by the active data catalog and policies from a policy store to provide access on datasets for downstream data platforms users.

In some embodiments, the processor may be further configured to: reconcile, by the reconciliation service, metadata information in a predefined periodic manner between the active data catalog and the downstream data platforms to ensure that the metadata in the active data catalog are the same as the metadata in the downstream data platforms.

In some embodiments, a non-transitory computer readable medium configured to store instructions for enabling consistent access control enforcement across downstream data platforms is disclosed. The instructions, when executed, may cause a processor to perform the following: implementing an active data catalog; receiving, by the active data catalog, metadata updates corresponding to a line of business including properties that may be used to control access enforcement across the downstream data platforms; executing a certification process to certify the metadata updates including the properties that may be used to control access enforcement; storing the certified metadata updates onto the active data catalog; updating the active data catalog with the certified metadata updates along with certification details data; publishing an event of the certified metadata updates for the downstream data platforms; distributing the certified metadata to the downstream data platforms; and applying changes, by consuming the event, corresponding to the certified metadata on the downstream data platforms enabling the consistent access control enforcement across the downstream data platforms.

In some embodiments, in executing the certification process, the instructions, when executed, may cause the processor to further perform the following: implementing an AI/ML model; and invoking the AI/ML model by calling a corresponding application programming interface to execute an auto approval check service to determine whether changes according to the metadata updates may be approved systematically without a data authority's intervention.

In some embodiments, when it is determined that the changes may be approved without the data authority's intervention, the instructions, when executed, may cause the processor to further perform the following: transmitting an electronic notification to a computing device utilized by the data authority indicating that the changes may be approved without the data authority's intervention; executing, by the AI/ML model, the auto approval check service to automatically certifying the metadata updates and closing the certification process; persisting all changes corresponding to the certified metadata updates in the active data catalog; and publishing by the downstream data platforms, in response to persisting all changes corresponding to the certified metadata, an acknowledgement event.

In some embodiments, when it is determined that the changes may not be approved without the data authority's intervention, the instructions, when executed, may cause the processor to further perform the following: transmitting an electronic notification to a computing device utilized by the data authority indicating that the changes may not be approved without the data authority's intervention; receiving input of a decision from the data authority indicating approval or rejection of the metadata changes in full or partial as appropriate by utilizing a catalog user interface; transmitting the decision back to the certification process via the catalog user interface; and publishing the event to a registration service about the decision and closing the certification process.

In some embodiments, in distributing the certified metadata to the downstream data platforms, the instructions, when executed, may cause the processor to further perform the following: applying, by the downstream data platforms, the certified metadata updates based on corresponding platform's native technologies by consuming the event; consuming, by an audit application, the event to start an event reconciliation workflow executed by a reconciliation service; consuming, by a data exchange application, the event to enable one-click access functionality, wherein one-click access allows an end user to determine whether the end user has access on a particular dataset and request access in a single click when it is determined that the end user does not have access to the particular dataset; publishing by the downstream data platforms, in response to persisting all changes corresponding to the certified metadata, an acknowledgement event; consuming the acknowledgement event by an audit application and closing the event reconciliation workflow.

In some embodiments, the instructions, when executed, may cause the processor to further perform the following: utilizing, by the downstream data platforms, the certified updated metadata distributed by the active data catalog and policies from a policy store to provide access on datasets for downstream data platforms users.

In some embodiments, the instructions, when executed, may cause the processor to further perform the following: reconciling, by the reconciliation service, metadata information in a predefined periodic manner between the active data catalog and the downstream data platforms to ensure that the metadata in the active data catalog are the same as the metadata in the downstream data platforms.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6A illustrates a table of dataset A of FIG. 5 in accordance with an embodiment.

FIG. 6B illustrates a table of dataset B of FIG. 5 in accordance with an embodiment.

FIG. 7 illustrates a table of data owner approval workflow audit table of FIG. 5 in accordance with an embodiment.

FIG. 8 illustrates a table of data element table of FIG. 5 in accordance with an embodiment.

FIG. 9 illustrates a table of data element certification audit table of FIG. 5 in accordance with an embodiment.

DETAILED DESCRIPTION

Figure 1:
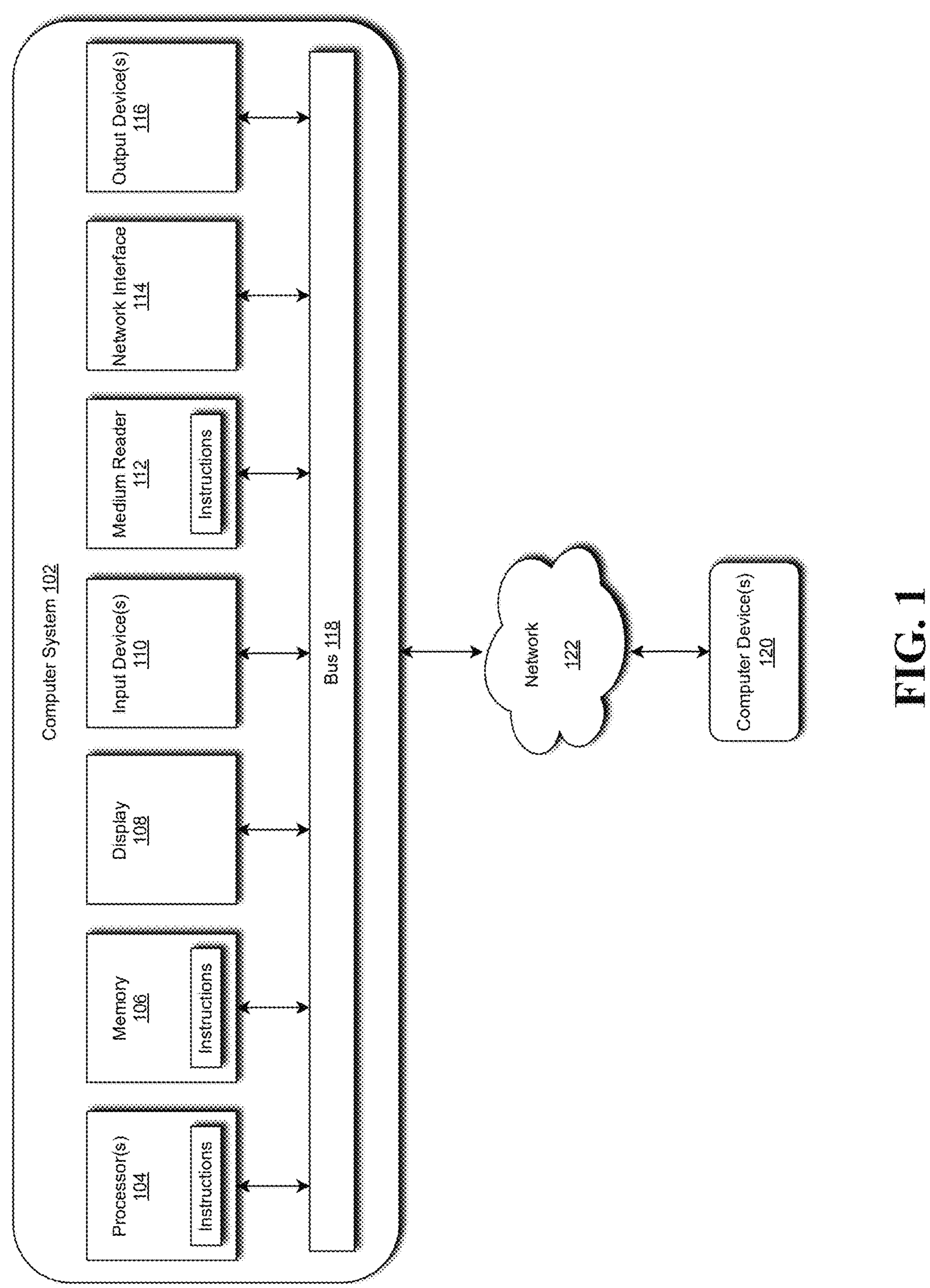
FIG. 1 illustrates a computer system for implementing a platform, language, database, and cloud agnostic metadata change management module configured for enablement of consistent access enforcement across data platforms triggered by an authoritative and active data catalog in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is a system 100 for use in implementing a platform, language, database, and cloud agnostic metadata change management module configured for enablement of consistent access enforcement across data platforms triggered by an authoritative and active data catalog in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 may be a personal computer. However, those skilled in the art appreciate that, in alternative embodiments of the present application, the computer device 120 may also be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the metadata change management module implemented by the system 100 may be platform, language, database, and cloud agnostic that may allow for consistent easy orchestration and passing of data through various components to output a desired result regardless of platform, browser, language, database, and cloud environment by writing programs accordingly. Since the disclosed process, in some embodiments, is platform, language, database, browser, and cloud agnostic, the metadata change management module may be independently tuned or modified for optimal performance without affecting the configuration or data files. The configuration or data files, in some embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
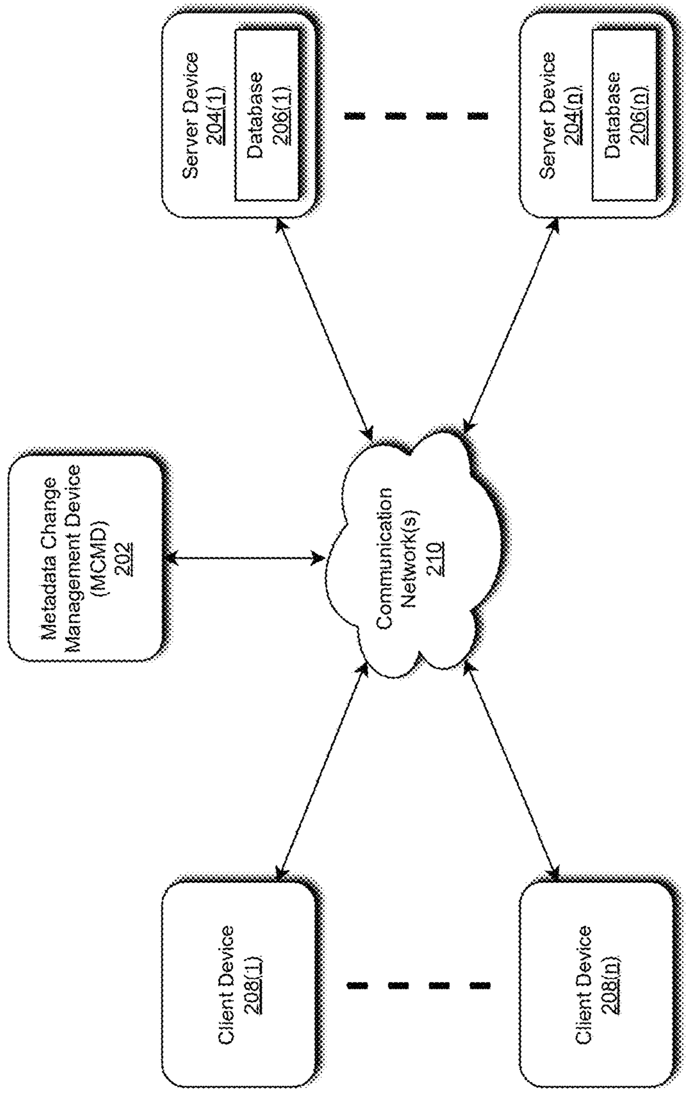
FIG. 2 illustrates a diagram of a network environment with a platform, language, database, and cloud agnostic metadata change management device in accordance with an embodiment.

Referring to FIG. 2, a schematic of a network environment 200 for implementing a language, platform, database, and cloud agnostic metadata change management device (MCMD) of the instant disclosure is illustrated.

In some embodiments, the above-described problems associated with conventional tools may be overcome by implementing a MCMD 202 as illustrated in FIG. 2 that may be configured for implementing a platform, language, database, and cloud agnostic metadata change management module configured for enablement of consistent access enforcement across data platforms triggered by an authoritative and active data catalog, but the disclosure is not limited thereto.

The MCMD 202 may include one or more computer system 102*s*, as described with respect to FIG. 1, which in aggregate provide the necessary functions.

The MCMD 202 may store one or more applications that can include executable instructions that, when executed by the MCMD 202, cause the MCMD 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MCMD 202 itself, may be located in virtual server(s) running in a cloud-based computing environment rather than being tied to one or more specific physical network computing devices. Also, the application(s) may be running in one or more virtual machines (VMs) executing on the MCMD 202. Additionally, in one or more embodiments of this technology, virtual machine(s) running on the MCMD 202 may be managed or supervised by a hypervisor.

In the network environment 200 of FIG. 2, the MCMD 202 may be coupled to a plurality of server devices 204(1)-204(*n*) that hosts a plurality of databases 206(1)-206(*n*), and also to a plurality of client devices 208(1)-208(*n*) via communication network(s) 210. A communication interface of the MCMD 202, such as the network interface 114 of the computer system 102 of FIG. 1, operatively couples and communicates between the MCMD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MCMD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MCMD 202 may be a standalone device or integrated with one or more other devices or apparatuses, such as one or more of the server devices 204(1)-204(*n*), for example. In one particular example, the MCMD 202 may be hosted by one of the server devices 204(1)-204(*n*), and other arrangements are also possible. Moreover, one or more of the devices of the MCMD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the MCMD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

In some embodiments, the client devices 208(1)-208(*n*) in this example may include any type of computing device that can facilitate the implementation of the MCMD 202 that may efficiently provide a platform for implementing a platform, language, database, and cloud agnostic metadata change management module configured for enablement of consistent access enforcement across data platforms triggered by an authoritative and active data catalog, but the disclosure is not limited thereto.

The client devices 208(1)-208(*n*) may run interface applications, such as standard web browsers or standalone client applications, which may provide an interface to communicate with the MCMD 202 via the communication network(s) 210 in order to communicate user requests. The client devices 208(1)-208(*n*) may further include, among other features, a display device, such as a display screen or touchscreen, and/or an input device, such as a keyboard, for example.

Although the network environment 200 with the MCMD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the MCMD 202, the server devices 204(1)-204(*n*), or the client devices 208(1)-208(*n*), for example, may be configured to operate as virtual instances on the same physical machine. For example, one or more of the MCMD 202, the server devices 204(1)-204(*n*), or the client devices 208(1)-208(*n*) may operate on the same physical device rather than as separate devices communicating through communication network(s) 210. Additionally, there may be more or fewer MCMDs 202, server devices 204(1)-204(*n*), or client devices 208(1)-208(*n*) than illustrated in FIG. 2. In some embodiments, the MCMD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
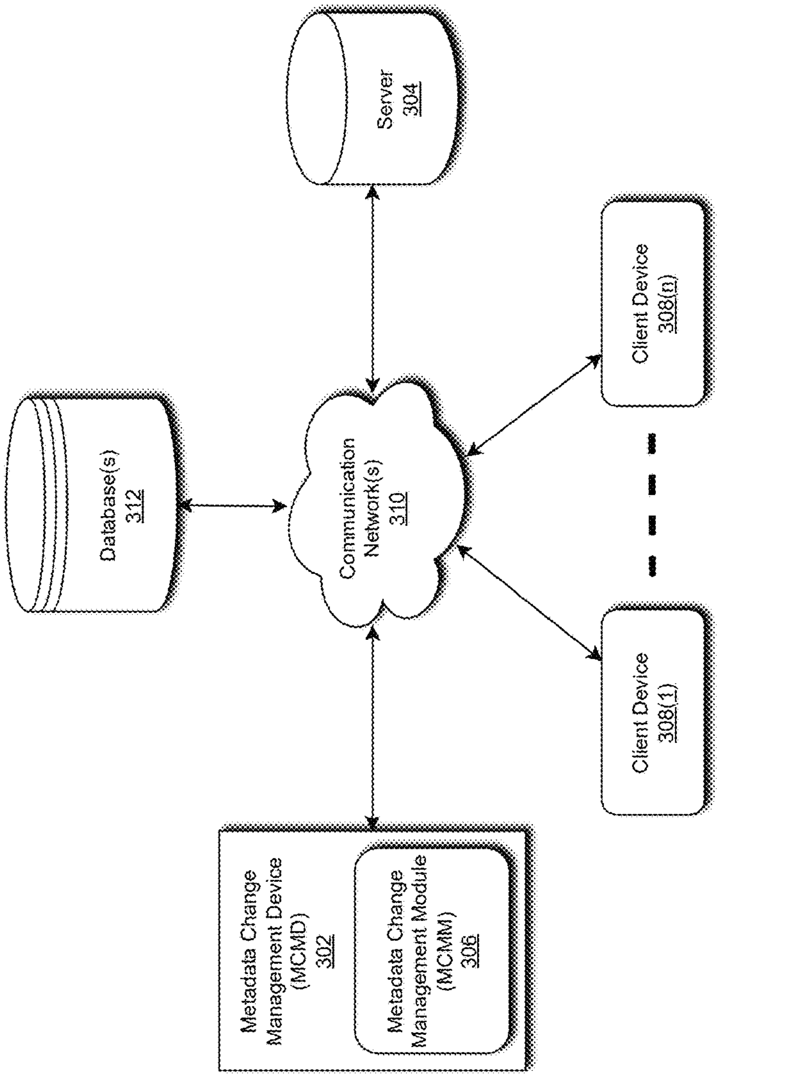
FIG. 3 illustrates a system diagram for implementing a platform, language, database, and cloud agnostic metadata change management device having a platform, language, database, and cloud agnostic metadata change management module in accordance with an embodiment.

FIG. 3 illustrates a system diagram for implementing a platform, language, and cloud agnostic MCMD having a platform, language, database, and cloud agnostic metadata change management module (MCMM) in accordance with an embodiment.

As illustrated in FIG. 3, the system 300 may include an MCMD 302 within which an MCMM 306 is embedded, a server 304, a database(s) 312, a plurality of client devices 308(1) . . . 308(*n*), and a communication network 310.

In some embodiments, the MCMD 302 including the MCMM 306 may be connected to the server 304, and the database(s) 312 via the communication network 310. The MCMD 302 may also be connected to the plurality of client devices 308(1) . . . 308(*n*) via the communication network 310, but the disclosure is not limited thereto. The database(s) 312 may include one or more rule databases.

In an embodiment, the MCMD 302 is described and shown in FIG. 3 as including the MCMM 306, although it may include other rules, policies, modules, databases, or applications, for example. In some embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

In some embodiments, the MCMM 306 may be configured to receive real-time feed of data from the plurality of client devices 308(1) . . . 308(*n*) and secondary sources via the communication network 310.

The MCMM 306 may be configured to: implement an active data catalog; receive, by the active data catalog, metadata updates corresponding to a line of business including properties that are used to control access enforcement across the downstream data platforms; execute a certification process to certify the metadata updates including the properties that are used to control access enforcement; store the certified metadata updates onto the active data catalog; update the active data catalog with the certified metadata updates along with certification details data; publish an event of the certified metadata updates for the downstream data platforms; distribute the certified metadata to the downstream data platforms; and apply changes, by consuming the event, corresponding to the certified metadata on the downstream data platforms enabling the consistent access control enforcement across the downstream data platforms, but the disclosure is not limited thereto.

The plurality of client devices 308(1) . . . 308(*n*) are illustrated as being in communication with the MCMD 302. In this regard, the plurality of client devices 308(1) . . . 308(*n*) may be "clients" (e.g., customers) of the MCMD 302 and are described herein as such. Nevertheless, it is to be known and understood that the plurality of client devices 308(1) . . . 308(*n*) need not necessarily be "clients" of the MCMD 302, or any entity described in association therewith herein. Any additional or alternative relationship may exist between either or both of the plurality of client devices 308(1) . . . 308(*n*) and the MCMD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(*n*) may communicate with the MCMD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The MCMD 302 may be the same or similar to the MCMD 202 as described with respect to FIG. 2, including any features or combination of features described with respect thereto.

Figure 4:
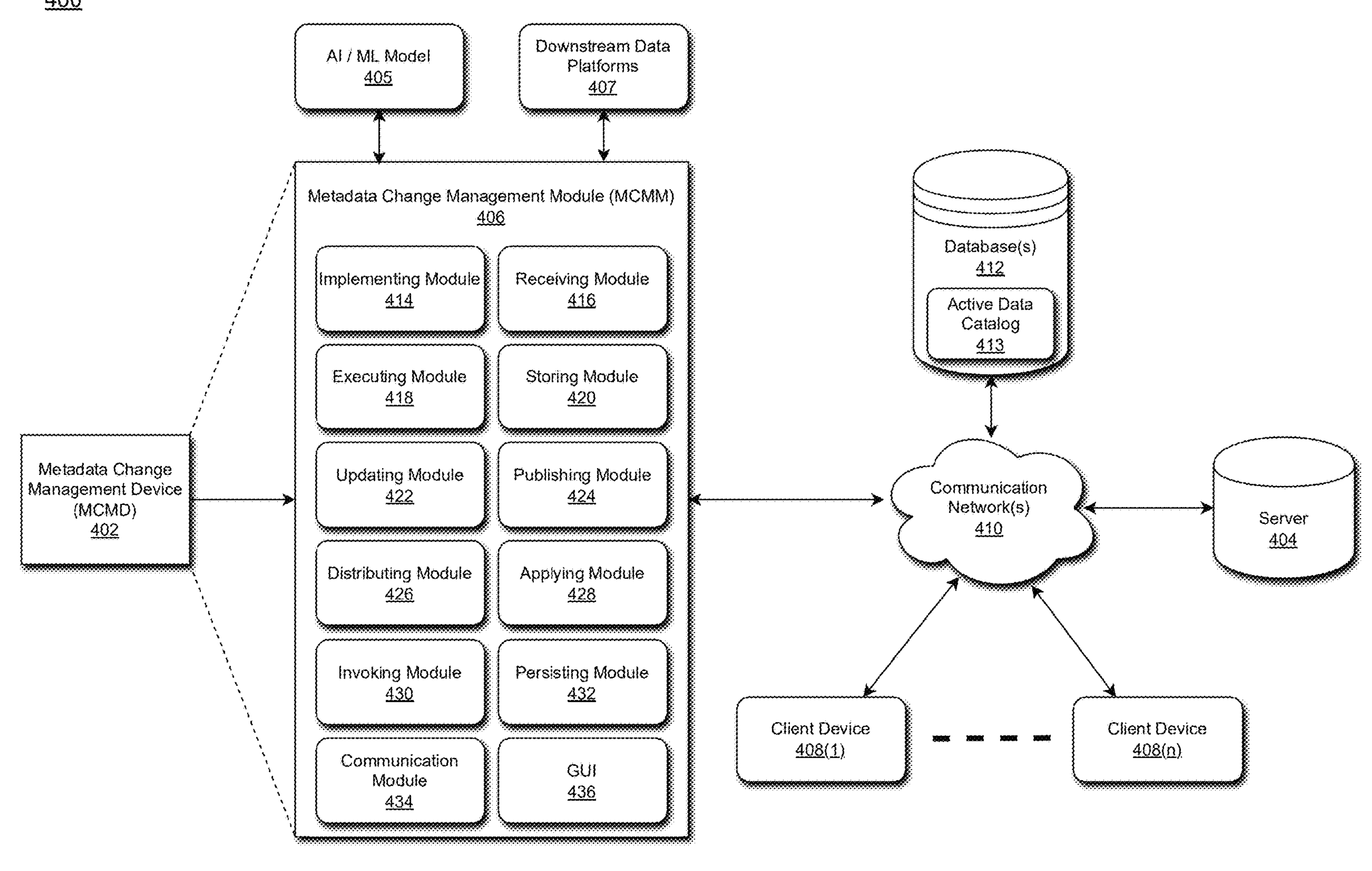
FIG. 4 illustrates a system diagram for implementing a platform, language, database, and cloud agnostic metadata change management module of FIG. 3 in accordance with an embodiment.

FIG. 4 illustrates a system diagram for implementing a platform, language, database, and cloud agnostic MCMM of FIG. 3 in accordance with an embodiment.

In some embodiments, the system 400 may include a platform, language, database, and cloud agnostic MCMD 402 within which a platform, language, database, and cloud agnostic MCMM 406 is embedded, a server 404, database(s) 412 that may store an active data catalog 413, and a communication network 410. In some embodiments, server 404 may comprise a plurality of servers located centrally or located in different locations, but the disclosure is not limited thereto.

In some embodiments, the MCMD 402 including the MCMM 406 may be connected to the server 404, an AI/ML model 406, downstream data platforms 407, and the database(s) 412 via the communication network 410. The MCMD 402 may also be connected to the plurality of client devices 408(1)-408(*n*) via the communication network 410, but the disclosure is not limited thereto. The MCMM 406, the server 404, the plurality of client devices 408(1)-408(*n*), the database(s) 412, the communication network 410 as illustrated in FIG. 4 may be the same or similar to the MCMM 306, the server 304, the plurality of client devices 308(1)-308(*n*), the database(s) 312, the communication network 310, respectively, as illustrated in FIG. 3.

Figure 5:
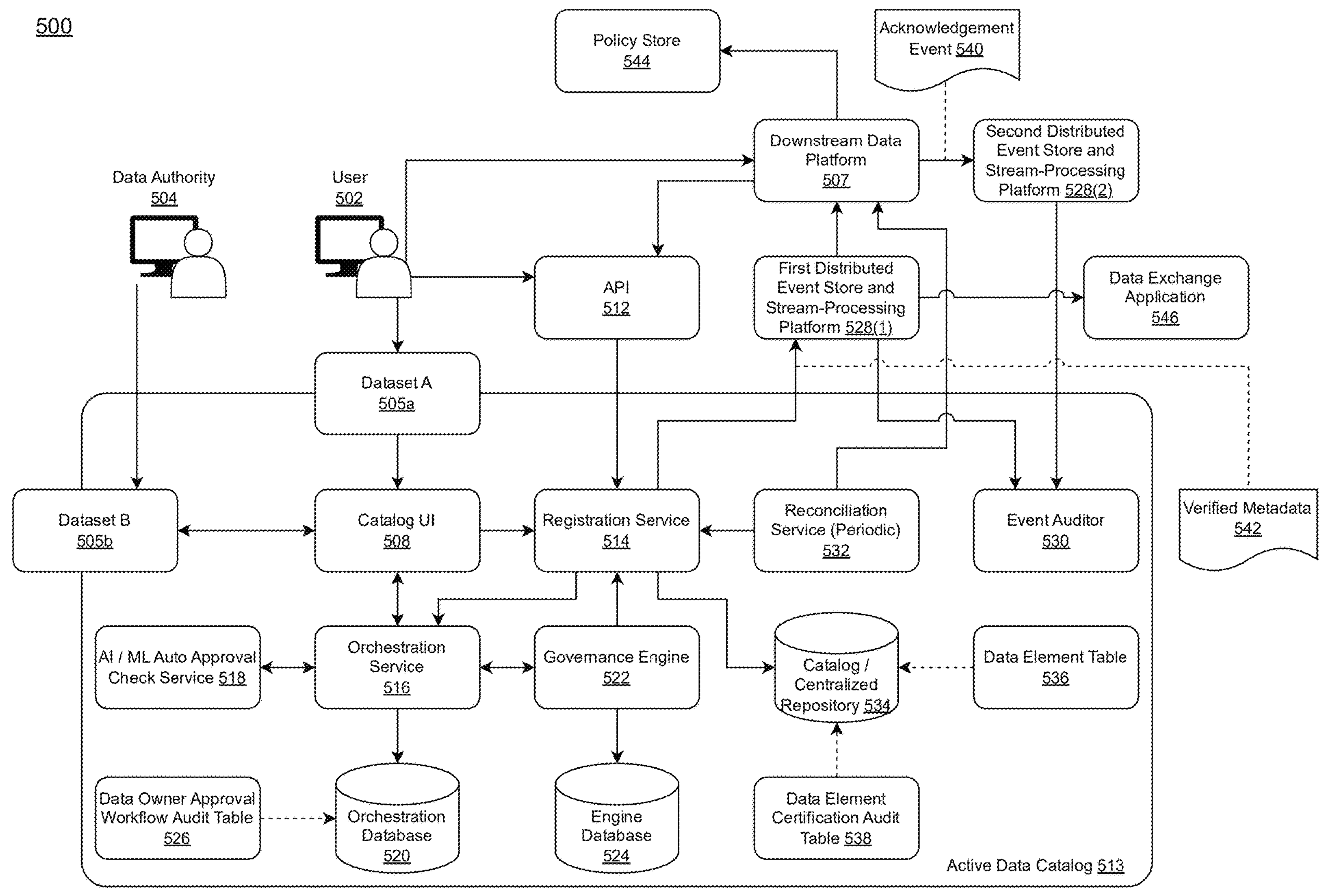
FIG. 5 illustrates an architecture implemented by the platform, language, database, and cloud agnostic metadata change management module of FIG. 4 in accordance with an embodiment.

Details of the MCMM 406 is provided below with corresponding modules that may be configured to, in combination, enabling consistent access enforcement across a plurality of data platforms (i.e., downstream data platforms 407) triggered by an authoritative and active data catalog (i.e., active data catalog 413 as illustrated in FIG. 4, or the active data catalog 513 as illustrated in FIG. 5), but the disclosure is not limited thereto. The active data catalog 413, 513 may be configured to serve as an authoritative system to collect, certify, store, and distribute metadata required for access controls to the downstream data platforms 407, wherein the authoritative system may be a catalog database (i.e., 412 as illustrated in FIG. 4 or the catalog/centralized repository 534 as illustrated in FIG. 5. The active data catalog 513 as illustrated in FIG. 5 may be the same or similar to the active data catalog 413 as illustrated in FIG. 4.

In some embodiments, as illustrated in FIG. 4, the MCMM 406 may include an implementing module 414, a receiving module 416, an executing module 418, a storing module 420, an updating module 422, a publishing module 424, a distributing module 426, an applying module 428, an invoking module 430, a persisting module 432, a communication module 434, and a GUI 436. In some embodiments, interactions and data exchange among these modules included in the MCMM 406 provide the advantageous effects of the disclosed invention. Functionalities of each module of FIG. 4 may be described in detail below with reference to FIGS. 4-11.

In some embodiments, each of the implementing module 414, receiving module 416, executing module 418, storing module 420, updating module 422, publishing module 424, distributing module 426, applying module 428, invoking module 430, persisting module 432, and the communication module 434 of the MCMM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

In some embodiments, each of the implementing module 414, receiving module 416, executing module 418, storing module 420, updating module 422, publishing module 424, distributing module 426, applying module 428, invoking module 430, persisting module 432, and the communication module 434 of the MCMM 406 of FIG. 4 may be implemented by microprocessors or similar, and may be programmed using software (e.g., microcode) to perform various functions discussed herein and may optionally be driven by firmware and/or software.

Alternatively, in some embodiments, each of the implementing module 414, receiving module 416, executing module 418, storing module 420, updating module 422, publishing module 424, distributing module 426, applying module 428, invoking module 430, persisting module 432, and the communication module 434 of the MCMM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the MCMM 406 of FIG. 4 may also be implemented by cloud based deployment.

In some embodiments, each of the implementing module 414, receiving module 416, executing module 418, storing module 420, updating module 422, publishing module 424, distributing module 426, applying module 428, invoking module 430, persisting module 432, and the communication module 434 of the MCMM 406 of FIG. 4 may be called via corresponding API, but the disclosure is not limited thereto.

In some embodiments, the process implemented by the MCMM 406 may be executed via the communication module 434 and the communication network 410, which may comprise plural networks as described above. For example, in an embodiment, the various components of the MCMM 406 may communicate with the server 404, and the database(s) 412 via the communication module 434 and the communication network 410 and the results (i.e., images in each steps, for example various tables 600*a*, 600*b*, 700, 800, 900, and events (represented as codes) 1000*a*, 1000*b* as illustrated in FIGS. 6-10, respectively, may be displayed onto the GUI 436. Of course, these embodiments are merely exemplary and are not limiting or exhaustive. The database(s) 412 may include the databases included within the private cloud and/or public cloud and the server 404 may include one or more servers within the private cloud and the public cloud.

For example, FIG. 5 illustrates an architecture 500 implemented by the platform, language, database, and cloud agnostic MCMM 406 of FIG. 4 in accordance with an embodiment. As illustrated in FIG. 5, the active data catalog 513 may include a catalog user interface (UI) 508, a registration service 514, an orchestration service 516, an AI/ML auto approval check service 518, an orchestration database 520 which may receive a data owner approval workflow audit table 526 (see, e.g., FIG. 7), a governance engine 522, an engine database 524, an event auditor 530, a reconciliation service 532, a catalog/centralized repository 534 which may receive a data element table 536 (see, e.g., FIG. 8) and a data element certification audit table 538 (see, e.g., FIG. 9).

As illustrated in FIG. 5, in the architecture 500, the active data catalog 513 may be operatively connected to the following, but the disclosure is not limited thereto: publisher applications that may be utilized by user 502 (e.g., systems or human users); data authority computing device that may be utilized by a data authority 504 (e.g., data owners or delegates); downstream data platform 507 operatively connected to a first distributed event store and stream processing platform 528(1), a second distributed event store and stream processing platform 528(2), and a policy store 544, wherein the first distributed event store and stream processing platform 528(1) being operatively connected to a data exchange application 546.

Referring back to FIGS. 4 and 5, in some embodiments, the implementing module 414 may be configured to implement the active data catalog 413, 513. During metadata collection, the publishers (such as systems or human users 502) may submit metadata updates to the active data catalog 413, 513, including properties that are used to control access. For example, the receiving module 416 may be configured to cause the active data catalog 413, 513 to receive metadata updates (e.g., dataset A 505*a*) corresponding to a line of business including properties that are used to control access enforcement across the downstream data platforms 407.

A table 600*a* of dataset A 505*a* is illustrated in FIG. 6A. As illustrated in FIG. 6A, the table 600*a* may include a name block, description block, sub line of business block, PCI (Payment Card Industry) indicator, a submit button, etc., but the disclosure is not limited thereto.

In some embodiments, in providing dataset B 505*b*, the data authority 504 may perform metadata verification and approval at field level. FIG. 6B illustrates a table 600*b* of dataset B 505*b* of FIG. 5 in accordance with an embodiment.

In some embodiments, the orchestration service 516 may update the workflows database for audit and workflow status, and then sends out notification to the data authorities 504 about change approval decision. FIG. 7 illustrates a table 700 illustrating data owner approval workflow audit table 526 of FIG. 5 in accordance with an embodiment. FIG. 8 illustrates a table 800 of a data element table of FIG. 5 in accordance with an embodiment.

For example, the executing module 418 may be configured to execute a certification process to certify the metadata updates including the properties that are used to control access enforcement. The storing module 420 may be configured to store the certified metadata updates onto the active data catalog 413, 513.

In some embodiments, the orchestration service 516 may publish event to the registration service 514 about the decision and closes the workflow. During metadata storage, the registration service 514 may update the catalog/centralized repository 534 with actual change and certification details like certified user and date-time etc. For example, FIG. 9 illustrates a table 900 of data element certification audit table of FIG. 5 in accordance with an embodiment.

In some embodiments, during metadata certification, the registration service 514 may invoke the orchestration service 516 with the changes or information that requires certification to start the certification or approval workflow.

In some embodiments, as part of the certification or approval workflow, orchestration service 516 may invoke AI/ML based auto approval check service (i.e., AI/ML model 405 as illustrated in FIG. 4) to determine whether the changes may be approved systematically. If yes, changes may be approved without the data authority's 504 intervention, and a notification may be sent to the data authority 504, workflow may be closed, and changes may be persisted in the catalog/centralized repository 534. The AI/ML model 405 may utilize the AI/ML auto approval check service 518 for automatically approving the changes.

In some embodiments, the AI/ML auto approval check service 518 may utilize the following processes to derive the metadata or tags for the elements that the user 502 may be trying to update and calculate accuracy and then approve, but the disclosure is not limited thereto. The AI/ML auto approval check service 518 may: utilize name matching algorithms to match the data element to existing sources with exact match; utilize name matching algorithms to identify similar elements from pre-defined patterns; implement algorithms using business logic from subject matter experts, and abbreviations and descriptions from other sources; utilize trained AI/ML models (Logical Regression, Ensemble model) (i.e., AI/ML model 405 as illustrated in FIG. 4) based on existing metadata in the catalog 534 and other sources; utilize turbo generative model to generate descriptions and utilize a wrapper model for embedding analysis to get better understanding of the context of data and data elements to be classified.

In some embodiments, the certification or approval workflow process on certifying the metadata (i.e., tags) may include the following processes when it is determined that the metadata change may not be approved automatically, but the disclosure is not limited thereto. The data owners or delegates (i.e., data authority 504 as illustrated in FIG. 5) may receive an email notification indicating that a task may require their review. The data owners or delegates may find the task on the catalog UI 508 for their review. In some embodiments, the users (i.e., user 502 as illustrated in FIG. 5) may assign the task to themselves if they are not the one who submitted the change. The user 502 may open the task details and may see a list of datasets (i.e., dataset A 505*a*, dataset B 505*b*) and data elements with their corresponding classification change proposals on the catalog UI 508. For each element change, the user 502 may choose to approve or reject the change or approve or reject all at once. Once approved or rejected, approved changes may be submitted back to the catalog 534. The catalog 534 may update the approved classification details along with approver and timestamp details. And the catalog 534 may publish a certification event (i.e., event informing change got certified on a particular dataset) for consumption by the downstream data platforms 407, 507. For rejected changes, an email may be sent to the submitter of the change along with the rejection reason provide by the reviewer.

In some embodiments, the downstream data platforms 407 (see FIG. 4) may apply the changes based on platforms' native technologies and may consume the event and applies the formation tags that are used for access control. The same event may be consumed by the event auditor to start the event reconciliation workflow.

In some embodiments, the event may be consumed by a platform where users may buy and sell data, as well to enable one click access functionality. The one click access may allow the end users to check if they have access on a particular dataset and request access in a single click if not present.

After application of change on the platforms, downstream data platforms 407, 507 may publish an acknowledgement event. The event auditor 530 may consume the acknowledgement event from the downstream data platforms 407, 507 and close the reconciliation workflow.

For example, referring back to FIGS. 4 and 5, the updating module 422 may be configured to update the active data catalog 413, 513 with the certified metadata updates along with certification details data; the publishing module 424 may be configured to publish an event of the certified metadata updates for the downstream data platforms 407, 507. The distributing module 426 may be configured to distribute the certified metadata to the downstream data platforms 407, 507. The applying module 428 may be configured to apply changes, by consuming the event, corresponding to the certified metadata on the downstream data platforms 407 enabling the consistent access control enforcement across the downstream data platforms 407, 507.

Referring back to FIGS. 4 and 5, in some embodiments, in executing the certification process, the implementing module 414 may be configured to implement an AI/ML model 405; and the invoking module 430 may be configured to invoke the AI/ML model 405 by calling a corresponding application programming interface to execute the AI/ML auto approval check service 518 to determine whether changes according to the metadata updates may be approved systematically without a data authority's 504 intervention.

In some embodiments, when it is determined that the changes may be approved without the data authority's 504 intervention, the communication module 434 may be configured to transmit an electronic notification to a computing device utilized by the data authority 504 indicating that the changes may be approved without the data authority's 504 intervention. The executing module 418 may be configured to execute, by the AI/ML model 405 implementing the AI/ML auto approval check service 518 to automatically certifying the metadata updates and close the certification process.

In some embodiments, the persisting module 432 may be configured to persist all changes corresponding to the certified metadata updates in the active data catalog 413, 523. The publishing module 424 may be configured to cause the downstream data platforms 407 to publish, in response to persisting all changes corresponding to the certified metadata, an acknowledgement event.

In some embodiments, when it is determined that the changes may not be approved without the data authority's 504 intervention, the communication module 434 may be configured to transmit an electronic notification to a computing device utilized by the data authority 504 indicating that the changes may not be approved without the data authority's 504 intervention. The receiving module 416 may be configured to receive input of a decision from the data authority 504 indicating approval or rejection of the metadata changes in full or partial as appropriate by utilizing the catalog UI 508. The communication module 434 may be further configured to transmit the decision back to the certification process via the catalog UI 508; and the publishing module 424 may be configured to publish the event to the registration service 532 about the decision and close the certification process.

Figure 10A:
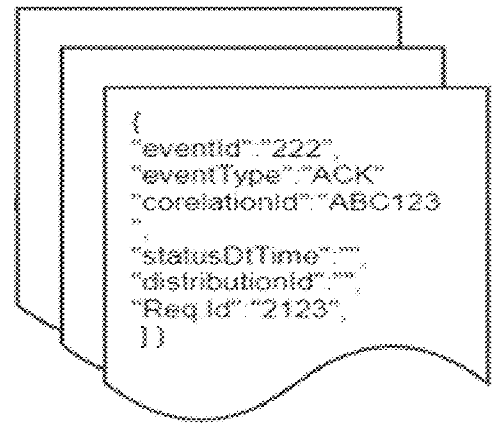
FIG. 10A illustrates a pseudo code of an acknowledgment event of FIG. 5 in accordance with an embodiment.

For example, FIG. 10A illustrates a pseudo code 1000*a* of an acknowledgement event 540 of FIG. 5 in accordance with an embodiment. As illustrated in FIG. 5, the downstream data platform 507 may send the acknowledgement event 540 to the event auditor 530 via the distributed event store and stream processing platform 528(2). This acknowledgement event 540 confirms the application of tags/metadata on the downstream data platform 507.

Figure 10B:
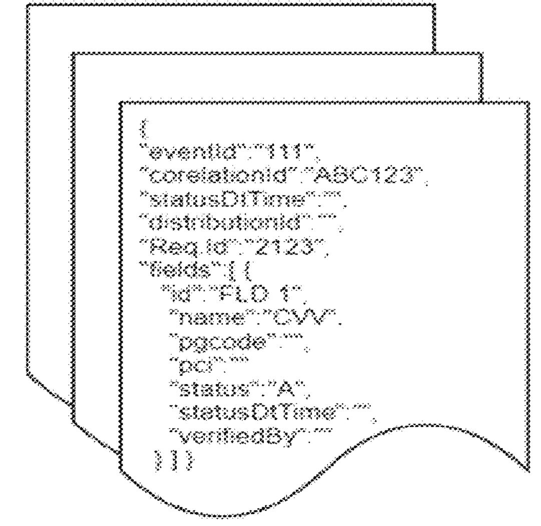
FIG. 10B illustrates a pseudo code of event of verified metadata of FIG. 5 in accordance with an embodiment.

The registration service 514 may utilize the first distributed event store and stream processing platform 528(1) for registration purposes and storing data onto the central repository 506. The first distributed event store and stream processing platform 528(1) may also send data to a data exchange application 546 for data consumption. The first distributed event store and stream processing platform 528(1) may also receive the verified metadata 542 and transfer the verified metadata 542 for storing onto the central repository. FIG. 10B illustrates a pseudo code of an event 1000*b* of verified metadata of FIG. 5 in accordance with an embodiment.

The governance engine 522 may be utilized for creating workflow and setting certification status. The engine database may store workflow status received from the governance engine 522.

Referring back to FIGS. 4 and 5, in some embodiments, in distributing the certified metadata (i.e., verified metadata 542) to the downstream data platforms 407, 507 the applying module 428 may be further configured to apply, by the downstream data platforms 407, 507 the certified metadata updates based on corresponding platform's native technologies by consuming the event. An audit application (i.e., embedded within the event auditor 530) may consume the event to start an event reconciliation workflow executed by the reconciliation service 532. The data exchange application 546 may consume the event to enable one-click access functionality. One-click access may allow an end user to determine whether the end user has access on a particular dataset and request access in a single click when it is determined that the end user does not have access to the particular dataset. The downstream data platforms 407, 507 may publish, in response to persisting all changes corresponding to the certified metadata, the acknowledgement event 540. The audit application may consume the acknowledgement event and close the event reconciliation workflow.

In some embodiments, the downstream data platforms 407, 507 may utilize the certified updated metadata distributed by the active data catalog 413, 513 and policies from the policy store 544 to provide access on datasets for downstream data platforms users.

In some embodiments, the reconciliation service 532 may reconcile metadata information in a predefined periodic manner between the active data catalog 413, 513 and the downstream data platforms 407, 507. In some embodiments, during this reconciliation of metadata process, the reconciliation service 532 may ensure that the metadata in the active data catalog 413, 513 are the same as the metadata in the downstream data platforms 407, 507.

In some embodiments, certified metadata may be distributed to the downstream data platforms 407 for consistent access control enforcement via a distributed event and stream processing platforms as illustrated in FIG. 5, but the disclosure is not limited thereto. For example, certified metadata may be distributed to the downstream data platforms 407, 507 for consistent access control enforcement via API (e.g., API 512 as illustrated in FIG. 5) and GUI 434 (see, e.g., FIG. 4).

Figure 11:
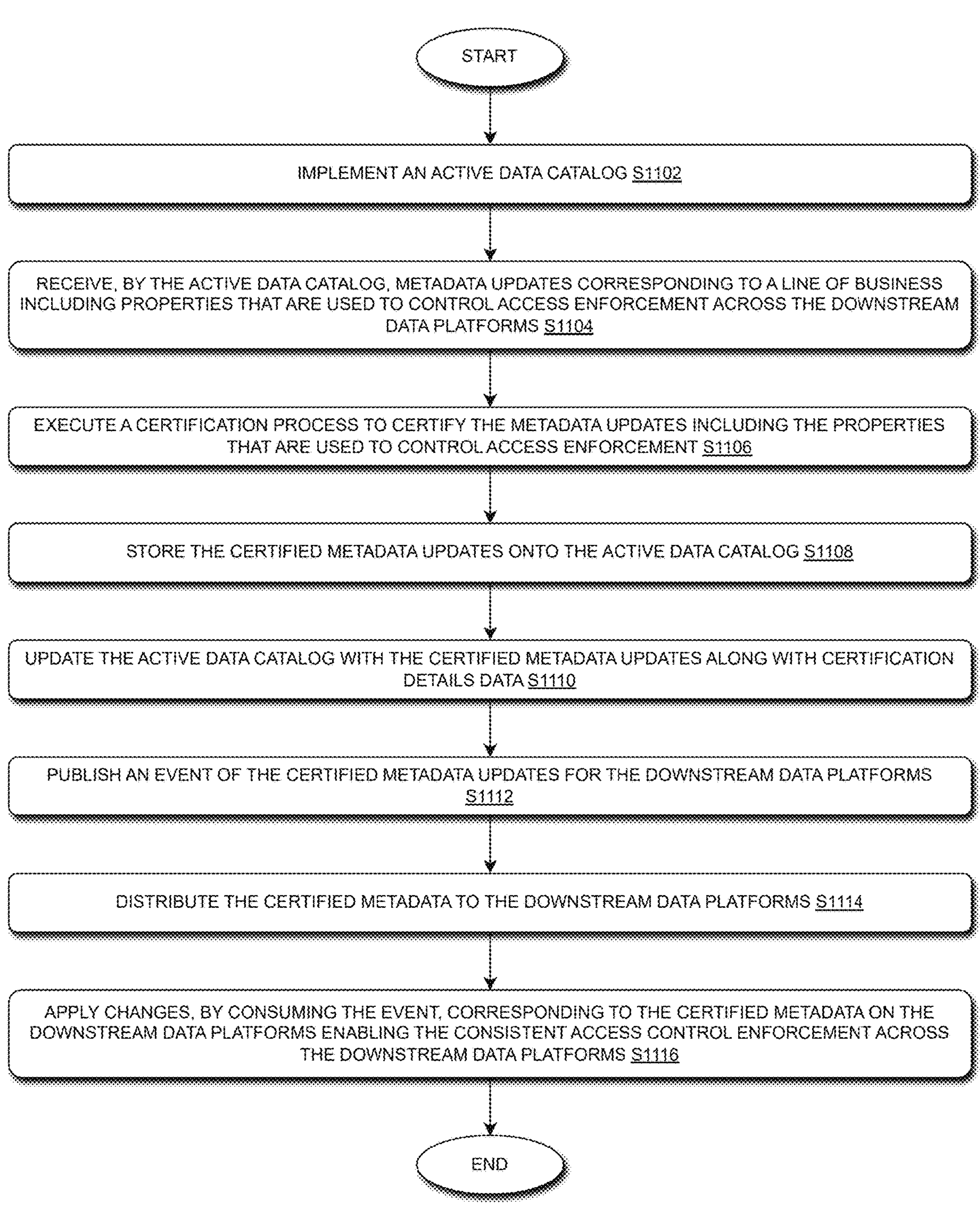
FIG. 11 illustrates a flow chart of a process implemented by the platform, language, database, and cloud agnostic metadata change management module of FIG. 4 for enablement of consistent access enforcement across data platforms triggered by an authoritative and active data catalog in accordance with an embodiment.

FIG. 11 illustrates a flow chart of a process 1100 implemented by the platform, language, database, and cloud agnostic MCMM 406 of FIG. 4 for enablement of consistent access enforcement across data platforms triggered by an authoritative and active data catalog in accordance with an embodiment. It may be appreciated that the illustrated process 1100 and associated steps may be performed in a different order, with illustrated steps omitted, with additional steps added, or with a combination of reordered, combined, omitted, or additional steps.

As illustrated in FIG. 11, at step S1102, the process 1100 may include implementing an active data catalog.

At step S1104, the process 1100 may include receiving, by the active data catalog, metadata updates corresponding to a line of business including properties that are used to control access enforcement across the downstream data platforms.

At step S1106, the process 1100 may include executing a certification process to certify the metadata updates including the properties that are used to control access enforcement.

At step S1108, the process 1100 may include storing the certified metadata updates onto the active data catalog.

At step S1110, the process 1100 may include updating the active data catalog with the certified metadata updates along with certification details data.

At step S1112, the process 1100 may include publishing an event of the certified metadata updates for the downstream data platforms.

At step S1114, the process 1100 may include distributing the certified metadata to the downstream data platforms.

At step S1116, the process 1100 may include applying changes, by consuming the event published at step S1112, corresponding to the certified metadata on the downstream data platforms enabling the consistent access control enforcement across the downstream data platforms.

In some embodiments, in executing the certification process, the process 1100 may further include: implementing an AI/ML model; and invoking the AI/ML model by calling a corresponding application programming interface to execute an auto approval check service to determine whether changes according to the metadata updates may be approved systematically without a data authority's intervention.

In some embodiments, when it is determined that the changes may be approved without the data authority's intervention, the process 1100 may include: transmitting an electronic notification to a computing device utilized by the data authority indicating that the changes may be approved without the data authority's intervention; executing, by the AI/ML model, the auto approval check service to automatically certifying the metadata updates and closing the certification process; persisting all changes corresponding to the certified metadata updates in the active data catalog; and publishing by the downstream data platforms, in response to persisting all changes corresponding to the certified metadata, an acknowledgement event.

In some embodiments, when it is determined that the changes may not be approved without the data authority's intervention, the process 1100 may include: transmitting an electronic notification to a computing device utilized by the data authority indicating that the changes may not be approved without the data authority's intervention; receiving input of a decision from the data authority indicating approval or rejection of the metadata changes in full or partial as appropriate by utilizing a catalog user interface; transmitting the decision back to the certification process via the catalog user interface; and publishing the event to a registration service about the decision and closing the certification process.

In some embodiments, in distributing the certified metadata to the downstream data platforms, the process 1100 may include: applying, by the downstream data platforms, the certified metadata updates based on corresponding platform's native technologies by consuming the event; consuming, by an audit application, the event to start an event reconciliation workflow executed by a reconciliation service; consuming, by a data exchange application, the event to enable one-click access functionality, wherein one-click access allows an end user to determine whether the end user has access on a particular dataset and request access in a single click when it is determined that the end user does not have access to the particular dataset; publishing by the downstream data platforms, in response to persisting all changes corresponding to the certified metadata, an acknowledgement event; consuming the acknowledgement event by an audit application and closing the event reconciliation workflow.

In some embodiments, the process 1100 may further include: utilizing, by the downstream data platforms, the certified updated metadata distributed by the active data catalog and policies from a policy store to provide access on datasets for downstream data platforms users.

In some embodiments, the process 1100 may further include: reconciling, by the reconciliation service, metadata information in a predefined periodic manner between the active data catalog and the downstream data platforms to ensure that the metadata in the active data catalog are the same as the metadata in the downstream data platforms.

In some embodiments, the MCMD 402 may include a memory (e.g., a memory 106 as illustrated in FIG. 1) which may be a non-transitory computer readable medium that may be configured to store instructions for implementing a platform, language, database, and cloud agnostic MCMM 406 for enabling consistent access control enforcement across downstream data platforms as disclosed herein. The MCMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the MCMM 406 or within the MCMD 402, may be used to perform one or more of the methods and processes as described herein. In a particular embodiment, the instructions may reside completely, or at least partially, within the memory 106, the medium reader 112, and/or the processor 104 (see FIG. 1) during execution by the MCMD 402.

In some embodiments, the instructions, when executed, may cause a processor embedded within the MCMM 406 or the MCMD 402 to perform the following: implementing an active data catalog; receiving, by the active data catalog, metadata updates corresponding to a line of business including properties that are used to control access enforcement across the downstream data platforms; executing a certification process to certify the metadata updates including the properties that are used to control access enforcement; storing the certified metadata updates onto the active data catalog; updating the active data catalog with the certified metadata updates along with certification details data; publishing an event of the certified metadata updates for the downstream data platforms; distributing the certified metadata to the downstream data platforms; and applying changes, by consuming the event, corresponding to the certified metadata on the downstream data platforms enabling the consistent access control enforcement across the downstream data platforms, but the disclosure is not limited thereto. In some embodiments, the processor may be the same or similar to the processor 104 as illustrated in FIG. 1 or the processor embedded within the MCMD 202, MCMD 302, MCMD 402, and MCMM 406 which is the same or similar to the processor 104.

In some embodiments, in executing the certification process, the instructions, when executed, may cause the processor 104 to further perform the following: implementing an AI/ML model; and invoking the AI/ML model by calling a corresponding application programming interface to execute an auto approval check service to determine whether changes according to the metadata updates may be approved systematically without a data authority's intervention.

In some embodiments, when it is determined that the changes may be approved without the data authority's intervention, the instructions, when executed, may cause the processor 104 to further perform the following: transmitting an electronic notification to a computing device utilized by the data authority indicating that the changes may be approved without the data authority's intervention; executing, by the AI/ML model, the auto approval check service to automatically certifying the metadata updates and closing the certification process; persisting all changes corresponding to the certified metadata updates in the active data catalog; and publishing by the downstream data platforms, in response to persisting all changes corresponding to the certified metadata, an acknowledgement event.

In some embodiments, when it is determined that the changes may be approved without the data authority's intervention, the instructions, when executed, may cause the processor 104 to further perform the following: transmitting an electronic notification to a computing device utilized by the data authority indicating that the changes may be approved without the data authority's intervention; receiving input of a decision from the data authority indicating approval or rejection of the metadata changes in full or partial as appropriate by utilizing a catalog user interface; transmitting the decision back to the certification process via the catalog user interface; and publishing the event to a registration service about the decision and closing the certification process.

In some embodiments, in distributing the certified metadata to the downstream data platforms, the instructions, when executed, may cause the processor 104 to further perform the following: applying, by the downstream data platforms, the certified metadata updates based on corresponding platform's native technologies by consuming the event; consuming, by an audit application, the event to start an event reconciliation workflow executed by a reconciliation service; consuming, by a data exchange application, the event to enable one-click access functionality, wherein one-click access allows an end user to determine whether the end user has access on a particular dataset and request access in a single click when it is determined that the end user does not have access to the particular dataset; publishing by the downstream data platforms, in response to persisting all changes corresponding to the certified metadata, an acknowledgement event; consuming the acknowledgement event by an audit application and closing the event reconciliation workflow.

In some embodiments, the instructions, when executed, may cause the processor 104 to further perform the following: utilizing, by the downstream data platforms, the certified updated metadata distributed by the active data catalog and policies from a policy store to provide access on datasets for downstream data platforms users.

In some embodiments, the instructions, when executed, may cause the processor 104 to further perform the following: reconciling, by the reconciliation service, metadata information in a predefined periodic manner between the active data catalog and the downstream data platforms to ensure that the metadata in the active data catalog are the same as the metadata in the downstream data platforms.

In some embodiments as disclosed above in FIGS. 1-11, technical improvements effected by the instant disclosure may include a platform for implementing a platform, language, database, and cloud agnostic metadata change management module configured for enablement of consistent access enforcement across data platforms triggered by an authoritative and active data catalog, but the disclosure is not limited thereto. Therefore, users can instantly gain insight into hallucination probability and revise a query accordingly.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for enabling consistent access control enforcement across downstream data platforms by utilizing one or more processors along with allocated memory, the method comprising:

implementing an active data catalog;

receiving, by the active data catalog, metadata updates corresponding to a line of business including properties that are used to control access enforcement across the downstream data platforms;

executing a certification process to certify the metadata updates including the properties that are used to control access enforcement, wherein the executing the certification process further comprising:

implementing an artificial intelligence/machine learning (AI/ML) model; and invoking the AI/ML model by calling a corresponding application programming interface to execute an auto approval check service to determine whether changes according to the metadata updates can be approved systematically without a data authority's intervention, and wherein the AI/ML auto approval check service is configured to:

utilize name matching algorithms to match the data element to existing sources with exact match;

utilize name matching algorithms to identify similar elements from pre-defined patterns; and implement algorithms using business logic from subject matter experts, and abbreviations and descriptions from other sources;

storing the certified metadata updates onto the active data catalog;

updating the active data catalog with the certified metadata updates along with certification details data;

publishing an event of the certified metadata updates for the downstream data platforms;

distributing the certified metadata to the downstream data platforms; and applying changes, by consuming the event, corresponding to the certified metadata on the downstream data platforms enabling the consistent access control enforcement across the downstream data platforms.

2. The method according to claim 1, when it is determined that the changes can be approved without the data authority's intervention, the method further comprising:

transmitting an electronic notification to a computing device utilized by the data authority indicating that the changes can be approved without the data authority's intervention;

executing, by the AI/ML model, the auto approval check service to automatically certifying the metadata updates and closing the certification process;

persisting all changes corresponding to the certified metadata updates in the active data catalog; and publishing by the downstream data platforms, in response to persisting all changes corresponding to the certified metadata, an acknowledgement event.

3. The method according to claim 1, when it is determined that the changes cannot be approved without the data authority's intervention, the method further comprising:

transmitting an electronic notification to a computing device utilized by the data authority indicating that the changes cannot be approved without the data authority's intervention;

receiving input of a decision from the data authority indicating approval or rejection of the metadata changes in full or partial as appropriate by utilizing a catalog user interface;

transmitting the decision back to the certification process via the catalog user interface; and publishing the event to a registration service about the decision and closing the certification process.

4. The method according to claim 1, wherein in distributing the certified metadata to the downstream data platforms further comprising:

applying, by the downstream data platforms, the certified metadata updates based on corresponding platform's native technologies by consuming the event;

consuming, by an audit application, the event to start an event reconciliation workflow executed by a reconciliation service;

consuming, by a data exchange application, the event to enable one-click access functionality, wherein one-click access allows an end user to determine whether the end user has access on a particular dataset and request access in a single click when it is determined that the end user does not have access to the particular dataset;

publishing by the downstream data platforms, in response to persisting all changes corresponding to the certified metadata, an acknowledgement event;

consuming the acknowledgement event by an audit application and closing the event reconciliation workflow.

5. The method according to claim 4, further comprising:

utilizing, by the downstream data platforms, the certified updated metadata distributed by the active data catalog and policies from a policy store to provide access on datasets for downstream data platforms users.

6. The method according to claim 4, further comprising:

reconciling, by the reconciliation service, metadata information in a predefined periodic manner between the active data catalog and the downstream data platforms to ensure that metadata in the active data catalog are the same as metadata in the downstream data platforms.

7. A system for enabling consistent access control enforcement across downstream data platforms, the system comprising:

a processor; and a memory operatively connected to the processor via a communication interface, the memory storing computer readable instructions, when executed, causes the processor to:

implement an active data catalog;

receive, by the active data catalog, metadata updates corresponding to a line of business including properties that are used to control access enforcement across the downstream data platforms;

execute a certification process to certify the metadata updates including the properties that are used to control access enforcement, wherein in executing the certification process, the processor is further configured to:

implement an artificial intelligence/machine learning (AI/ML) model; and invoke the AI/ML model by calling a corresponding application programming interface to execute an auto approval check service to determine whether changes according to the metadata updates can be approved systematically without a data authority's intervention, and wherein the AI/ML auto approval check service is configured to:

utilize name matching algorithms to match the data element to existing sources with exact match;

utilize name matching algorithms to identify similar elements from pre-defined patterns; and implement algorithms using business logic from subject matter experts, and abbreviations and descriptions from other sources;

store the certified metadata updates onto the active data catalog;

update the active data catalog with the certified metadata updates along with certification details data;

publish an event of the certified metadata updates for the downstream data platforms;

distribute the certified metadata to the downstream data platforms; and apply changes, by consuming the event, corresponding to the certified metadata on the downstream data platforms enabling the consistent access control enforcement across the downstream data platforms.

8. The system according to claim 7, when it is determined that the changes can be approved without the data authority's intervention, the processor is further configured to:

transmit an electronic notification to a computing device utilized by the data authority indicating that the changes can be approved without the data authority's intervention;

execute, by the AI/ML model, the auto approval check service to automatically certifying the metadata updates and close the certification process;

persist all changes corresponding to the certified metadata updates in the active data catalog; and publish by the downstream data platforms, in response to persisting all changes corresponding to the certified metadata, an acknowledgement event.

9. The system according to claim 7, when it is determined that the changes cannot be approved without the data authority's intervention, the processor is further configured to:

transmit an electronic notification to a computing device utilized by the data authority indicating that the changes cannot be approved without the data authority's intervention;

receive input of a decision from the data authority indicating approval or rejection of the metadata changes in full or partial as appropriate by utilizing a catalog user interface;

transmit the decision back to the certification process via the catalog user interface; and publish the event to a registration service about the decision and close the certification process.

10. The system according to claim 7, wherein in distributing the certified metadata to the downstream data platforms, the processor is further configured to:

apply, by the downstream data platforms, the certified metadata updates based on corresponding platform's native technologies by consuming the event;

consume, by an audit application, the event to start an event reconciliation workflow executed by a reconciliation service;

consume, by a data exchange application, the event to enable one-click access functionality, wherein one-click access allows an end user to determine whether the end user has access on a particular dataset and request access in a single click when it is determined that the end user does not have access to the particular dataset;

publish by the downstream data platforms, in response to persisting all changes corresponding to the certified metadata, an acknowledgement event;

consume the acknowledgement event by an audit application and close the event reconciliation workflow.

11. The system according to claim 10, wherein the processor is further configured to:

utilize, by the downstream data platforms, the certified updated metadata distributed by the active data catalog and policies from a policy store to provide access on datasets for downstream data platforms users.

12. The system according to claim 10, wherein the processor is further configured to:

reconcile, by the reconciliation service, metadata information in a predefined periodic manner between the active data catalog and the downstream data platforms to ensure that metadata in the active data catalog are the same as metadata in the downstream data platforms.

13. A non-transitory computer readable medium configured to store instructions for enabling consistent access control enforcement across downstream data platforms, the instructions, when executed, cause a processor to perform the following:

implementing an active data catalog;

receiving, by the active data catalog, metadata updates corresponding to a line of business including properties that are used to control access enforcement across the downstream data platforms;

executing a certification process to certify the metadata updates including the properties that are used to control access enforcement, wherein in executing the certification process, the instructions, when executed, cause the processor to further perform the following:

implementing an artificial intelligence/machine learning (AI/ML) model; and invoking the AI/ML model by calling a corresponding application programming interface to execute an auto approval check service to determine whether changes according to the metadata updates can be approved systematically without a data authority's intervention, and wherein the AI/ML auto approval check service is configured to:

utilize name matching algorithms to match the data element to existing sources with exact match;

utilize name matching algorithms to identify similar elements from pre-defined patterns; and implement algorithms using business logic from subject matter experts, and abbreviations and descriptions from other sources;

storing the certified metadata updates onto the active data catalog;

updating the active data catalog with the certified metadata updates along with certification details data;

publishing an event of the certified metadata updates for the downstream data platforms;

distributing the certified metadata to the downstream data platforms; and applying changes, by consuming the event, corresponding to the certified metadata on the downstream data platforms enabling the consistent access control enforcement across the downstream data platforms.

14. The non-transitory computer readable medium according to claim 13, when it is determined that the changes can be approved without the data authority's intervention, the instructions, when executed, cause the processor to further perform the following:

transmitting an electronic notification to a computing device utilized by the data authority indicating that the changes can be approved without the data authority's intervention;

executing, by the AI/ML model, the auto approval check service to automatically certifying the metadata updates and closing the certification process;

persisting all changes corresponding to the certified metadata updates in the active data catalog; and publishing by the downstream data platforms, in response to persisting all changes corresponding to the certified metadata, an acknowledgement event.

15. The non-transitory computer readable medium according to claim 13, when it is determined that the changes cannot be approved without the data authority's intervention, t the instructions, when executed, cause the processor to further perform the following:

transmitting an electronic notification to a computing device utilized by the data authority indicating that the changes cannot be approved without the data authority's intervention;

receiving input of a decision from the data authority indicating approval or rejection of the metadata changes in full or partial as appropriate by utilizing a catalog user interface;

transmitting the decision back to the certification process via the catalog user interface; and publishing the event to a registration service about the decision and closing the certification process.

16. The non-transitory computer readable medium according to claim 13, wherein in distributing the certified metadata to the downstream data platforms, the instructions, when executed, cause the processor to further perform the following:

applying, by the downstream data platforms, the certified metadata updates based on corresponding platform's native technologies by consuming the event;

consuming, by an audit application, the event to start an event reconciliation workflow executed by a reconciliation service;

consuming, by a data exchange application, the event to enable one-click access functionality, wherein one-click access allows an end user to determine whether the end user has access on a particular dataset and request access in a single click when it is determined that the end user does not have access to the particular dataset;

publishing by the downstream data platforms, in response to persisting all changes corresponding to the certified metadata, an acknowledgement event;

consuming the acknowledgement event by an audit application and closing the event reconciliation workflow.

17. The non-transitory computer readable medium according to claim 16, the instructions, when executed, cause the processor to further perform the following:

utilizing, by the downstream data platforms, the certified updated metadata distributed by the active data catalog and policies from a policy store to provide access on datasets for downstream data platforms users.

18. The non-transitory computer readable medium according to claim 16, the instructions, when executed, cause the processor to further perform the following:

reconciling, by the reconciliation service, metadata information in a predefined periodic manner between the active data catalog and the downstream data platforms to ensure that metadata in the active data catalog are the same as metadata in the downstream data platforms.

* * * * *